Aug. 30, 1966 L. M. MICHARD 3,269,662
JET PROPULSION UNIT WITH MOVABLE NOZZLE
Filed April 30, 1964 2 Sheets-Sheet 1
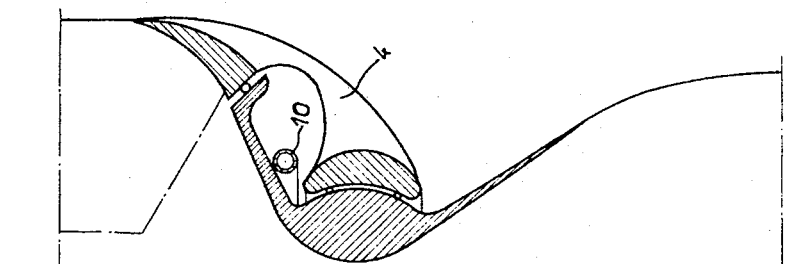
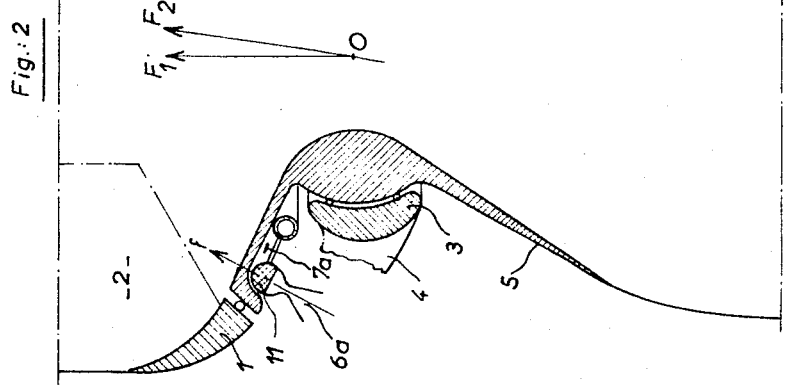
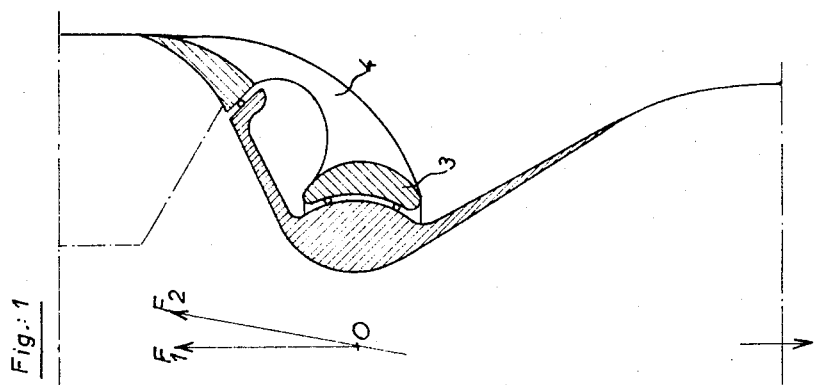
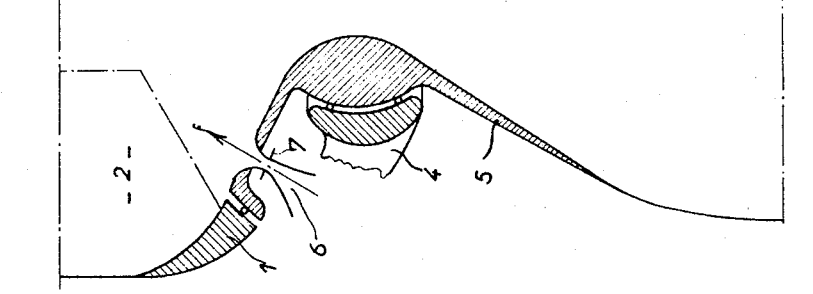
Inventor
Louis M. Michard
By Stevens, Davis, Miller + Mosher
Attorneys Aug. 30, 1966   L. M. MICHARD   3,269,662
JET PROPULSION UNIT WITH MOVABLE NOZZLE
Filed April 30, 1964   2 Sheets-Sheet 2
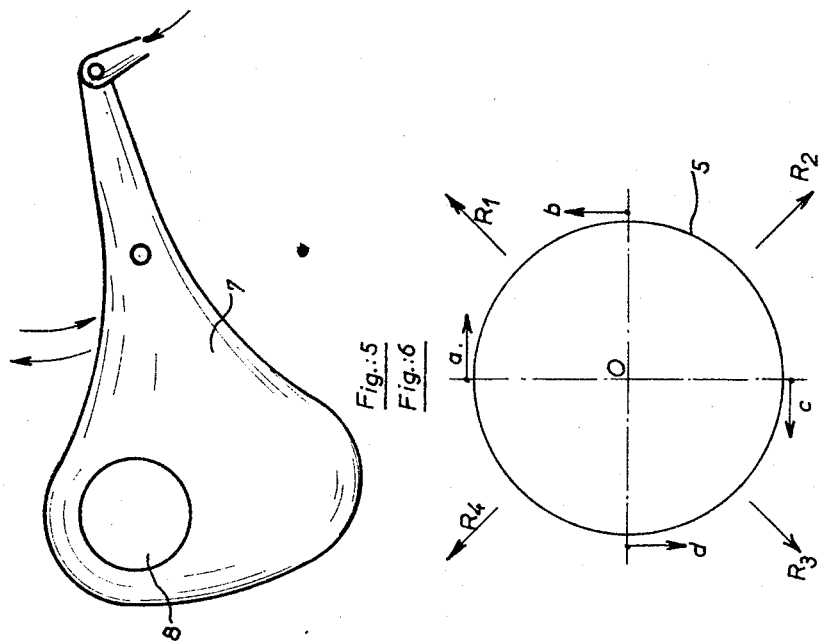
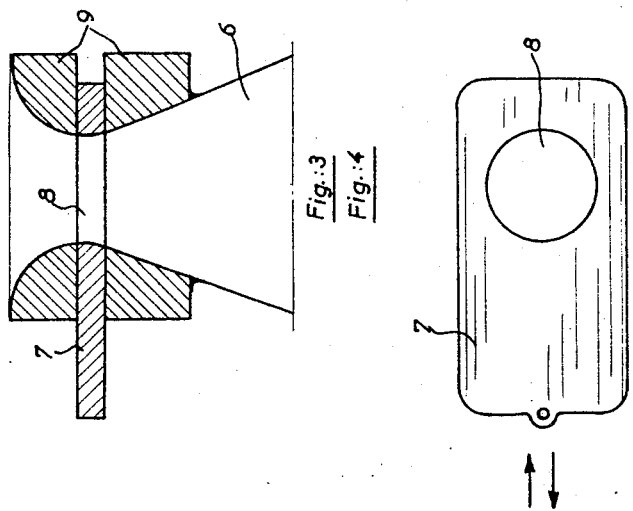
Inventor
Louis M. Michard
By Stevens, Davis, Miller & Mosher
Attorneys ns**

United States Patent Office 3,269,662
Patented August 30, 1966

3,269,662
JET PROPULSION UNIT WITH MOVABLE NOZZLE
Louis Mary Michard, Fontenay-aux-Roses, France, assignor to Societe Nationale d'Etude et de Construction de Moteurs d'Aviation, Paris, France, a company of France
Filed Apr. 30, 1964, Ser. No. 363,913
Claims priority, application France, May 6, 1963, 933,806
9 Claims. (Cl. 239—265.25)

It is known that to guide and stabilize a rocket by causing the direction of the thrust vector to vary in the course of the trajectory. Various arrangements may be used for this purpose such as, for instance, a pivotable nozzle, a nozzle rotating about an inclined axis or deflection of the propulsive jet by auxiliary jets or obstacles.

The present invention has for its object to provide a jet propulsion unit having a nozzle of the orientable type. The invention resides more particularly in the method of control of orientation of the nozzle.

According to the invention, this control is effected by means of auxiliary nozzles which are rigid with the movable main nozzle and are selectively supplied with motive gas, the auxiliary nozzles being located at a radial distance (which is advantageously the same for all the auxiliary nozzles) from the center or axis of rotation of the main nozzle and opening to the exterior in a direction close to the normal to the direction of this radial distance, in such manner that when an auxiliary nozzle is supplied with motive gas it produces an auxiliary thrust exerting an orientating moment on the main nozzle.

The supply to the auxiliary nozzles can be effected from the driving gases of the rocket themselves, the nozzles communicating upstream with the interior of the rocket body.

As an alternative, the supply to the auxiliary nozzles may be obtained from a separate auxiliary source such as, for example, an independent gas generator or a cylinder or reservoir of fluid under pressure.

The description which follows with reference to the accompanying drawings is given by way of non-limitative example only and will make it clearly understood how the invention can be carried into effect, the details appearing both from the text and from the drawings forming part of the said invention. In the drawings:

FIGURE 1 is a diagrammatic axial section of the rear portion of a rocket equipped with an orientable nozzle according to the present invention;

FIGURE 2 is a similar section showing a modified constructional form of the invention;

FIGURE 3 is a diagrammatic section on a larger scale of an auxiliary nozzle and a closure member therefor;

FIGURES 4 and 5 are views of two alternative forms of closure member for the nozzle of FIGURE 3 and FIGURE 6 is an explanatory diagram indicating how the invention may be adapted for the purpose of a complementary roll control.

Referring to FIGURES 1 and 2, there will be seen at 1 the fixed end portion of a rocket body in which the propellant charge 2 is housed and which is fast with a knuckle 3 connected to the rocket body by four arms 4. In this knuckle there is mounted an orientable nozzle 5 which can pivot about a point O located in the plane of the throat or in a plane adjacent to the plane of the throat.

It will be noted that the knuckle is disposed in a cold zone and that the junction between the movable portion and the fixed portion of the rocket is located in a zone where the gases are at low velocity, so that a slight leakage is permissible at this point, if need be.

In the constructional form shown in FIGURE 1, the movable nozzle 5 comprises, in the spaces between the arms 4, four small auxiliary nozzles 6, only one of which can be seen in the drawing. The nozzles 6 are located on two transverse axes which are a right angles to each other and at equal distances from the centre O. These nozzles advantageously have their axes close to the direction normal to the radius passing through O. They place the interior of the rocket in communication with the outside and consequently receive the gases of combustion originating from the charge 2, in the same way as the nozzle 5.

The nozzles 6 are equipped with selectively controlled individual closure members 7, each of which ensures, when open, that the corresponding nozzle is supplied with gas and that an auxiliary jet is produced giving a reaction $f$ which exerts a moment about the point O on the nozzle 5, it being possible for the angular displacement of the nozzle 5 resulting therefrom to be limited by stops (not shown). The thrust axis, which was previously in the direction F2, is then inclined and reaches the direction F2.

It will be noted that this new direction F2 of the thrust is in the same general direction as the force $f$ which has given rise thereto, or in other words $f$ has a major component parallel to F2, so that the invention succeeds in causing the energy used in maneuvering the nozzle to participate in the propulsion; in the example considered, this energy is actually the energy of a portion of the gases of the propulsion unit. The only energy which is actually wasted is that necessary for controlling the opening and closing of the small nozzles 6 in addition to that due to the minor component of $f$ perpendicular to F2. This control is subject to the usual stabilizing and guidance devices of the rocket.

The selective closing or opening of the auxiliary nozzles 6 may be obtained, for example, by means of a tungsten plate 7 (see FIGURES 3 to 5) having a hole 8 corresponding to the cross-section of the throat of the corresponding nozzle. This plate is movably mounted, at the level of the throat, between graphite elements 9, it being possible to effect this movement by translation (see FIGURE 4) or by rotation (see FIGURE 5).

It will be quite obvious that the four auxiliary nozzles 6 could be supplied continuously, in which case the maneuvering of the nozzle 5 would be effected by selective deflection of the reaction jet of these nozzles by any suitable known means.

Moreover, it is not essential to resort to the propulsive gases of the rocket themselves for supplying the auxiliary nozzles. FIGURE 2 shows a modified constructional form in which the auxiliary nozzles 6a are provided with an independent gas generator, for example a torus 10 filled with a propellant which is kept under pressure by a cylinder of compressed gas, or a small gas generator using solid or liquid rocket fuel. The valve 7a is controlled by a guide device; when the valve is open, the liquid propellant passes through a catalyst 11 and the gases produced are discharged through the nozzle 6a. The reaction $f$ produced in this way ensures the maneuvering of the nozzle 5, as before. This solution enables the rocket to be guided even after it has been extinguished.

Moreover, by slightly modifying the inclination of the auxiliary nozzles provided in accordance with the invention, it is possible to obtain stabilization in rolling. In effect, instead of the reaction $f$ being located in the plane of FIGURES 1 and 2, it is exerted in a direction slightly inclined thereto, so as to have tangential components $a, b, c, d$, as indicated in the diagram of FIGURE 6.

By combining $a$ and $c$ on the one hand and $b$ and $d$ on the other, stabilization in rolling is obtained. In this case, for the control of yawing and pitching, it is necessary to combine *a* and *b* to have a resultant R1; *a* and *d* to have a resultant R2; *c* and *d* to have a resultant R3; *c* and *b* to have a resultant R4.

It is obvious that modifications may be made in the constructional forms which have been described herein, in particular by substituting equivalent technical means, without thereby departing from the scope of the invention as defined by the claims.

What I claim is:

1. A jet propulsion unit having a body, a main nozzle which is mounted for orientating movement relatively to said body, about a center or axis of rotation, auxiliary nozzles which are rigid with the main nozzle and are radially spaced from the center or axis of rotation and which are adapted to discharge jets of gas in a direction substantially normal to the radial direction relatively to said center or axis of rotation and means for supplying gas to said auxiliary nozzles selectively, whereby when gas is supplied to any one of said auxiliary nozzles, discharge of gas from said one nozzle produces an auxiliary thrust exerting an orientating moment on said main nozzle.

2. A jet propulsion unit having a body, a main nozzle which is mounted for orientating movement relatively to said body, about a center or axis of rotation, auxiliary nozzles which are rigid with the main nozzle and are radially spaced from the center or axis of rotation and which are adapted to discharge jets of gas in a direction substantially normal to the radial direction relatively to said center or axis of rotation and means for deflecting the direction of discharge of the jets of gas from said auxiliary nozzles, whereby selective control of the respective auxiliary nozzles gives rise to controlled orientating movement of said main nozzle.

3. A jet propulsion unit having a source of driving gases, a body, a main nozzle which is mounted for orientating movement relatively to said body, about a center or axis of rotation, auxiliary nozzles which are rigid with the main nozzle and are radially spaced from the center or axis of rotation and which are adapted to discharge jets of gas in a direction substantially normal to the radial direction relatively to said center or axis of rotation and control means controlling the operation of said auxiliary nozzles so as to give rise to orientating movement of said main nozzle.

4. A jet propulsion unit according to claim 3, wherein the respective auxiliary nozzles are radially spaced from the center or axis of rotation at substantially equal radial distances.

5. A jet propulsion unit according to claim 3, wherein said body has an internal space for the passage of driving gases from said source to said main nozzle, said auxiliary nozzles communicating, in the upstream direction thereof, with said internal space, whereby the supply of gas to said auxiliary nozzles is derived from said driving gases.

6. A jet propulsion unit according to claim 3, including a further gas source for supplying said auxiliary nozzles separately from said main nozzle.

7. A jet propulsion unit according to claim 3, including separate auxiliary gas sources for the respective auxiliary nozzles.

8. A jet propulsion unit according to claim 2, including means for supplying gas to said auxiliary nozzles continuously.

9. A jet propulsion unit according to claim 3, wherein the direction of discharge of the jet of gas from each said auxiliary nozzle is inclined relatively to the plane containing the thrust axis of the main nozzle, whereby the thrusts produced by the discharge of gas from the auxiliary nozzles have components in the tangential direction which provide rolling-stabilization.

References Cited by the Examiner

UNITED STATES PATENTS 3,048,977    8/1962    Geary _____ 60—35.55

EVERETT W. KIRBY, *Primary Examiner*.